(12) United States Patent
McKinney (10) Patent No.: US 7,294,261 B2
(45) Date of Patent: Nov. 13, 2007

(54) VESSEL ASSEMBLY FOR USE IN A WASTEWATER TREATMENT SYSTEM

(75) Inventor: Jerry L. McKinney, Silsbee, TX (US)

(73) Assignee: Jerry L. McKinney 2002 Trust, Silsbee, TX (US)

( * ) Notice: Subject to any disclaimer, the term of this patent is extended or adjusted under 35 U.S.C. 154(b) by 0 days.

(21) Appl. No.: 11/503,423

(22) Filed: Aug. 11, 2006

(65) Prior Publication Data

US 2007/0095735 A1 May 3, 2007

Related U.S. Application Data

(63) Continuation-in-part of application No. 11/263,462, filed on Oct. 31, 2005.

(51) Int. Cl.
*C02F 3/00* (2006.01)

(52) U.S. Cl. .................................. 210/220; 210/532.2

(58) Field of Classification Search ................ 210/220, 210/532.2
See application file for complete search history.

(56) References Cited

U.S. PATENT DOCUMENTS 6,358,411 B1 * 3/2002 McKinney ............. 210/170.08

OTHER PUBLICATIONS

Alpha General Services, Inc, www.alphageneral.com, Product Catalog, including picture of Alpha 750 Septic Tanks—3 pgs.

* cited by examiner

*Primary Examiner*—Chester T. Barry
(74) *Attorney, Agent, or Firm*—Browning Bushman P.C.

(57) ABSTRACT

A vessel assembly for use in a wastewater treatment system having a first vessel, a second vessel, a first gusset assembly attached to and connecting the first and second vessels and a second gusset assembly attached to and connecting the vessels, at least one of the gusset assemblies provides an upwardly facing surface or pocket for holding fill materials such as dirt or gravel to counter buoyancy acting on the vessel assembly.

26 Claims, 4 Drawing Sheets

VESSEL ASSEMBLY FOR USE IN A WASTEWATER TREATMENT SYSTEM

CROSS REFERENCE TO RELATED APPLICATIONS

This application is a continuation-in-part of U.S. patent application Ser. No. 11/263,462 filed Oct. 31, 2005 for Aerobic Vessel For Use In Aerobic Wastewater Treatment System, the disclosure of which is incorporated herein by reference for all purposes.

BACKGROUND OF THE INVENTION

1. Field of the Invention

The present invention relates to aerobic wastewater treatment systems, e.g., aerobic wastewater treatment systems and, more particularly, to a vessel assembly for use in such systems.

2. Description of Prior Art

Aerobic wastewater treatment systems are generally comprised of three main vessels, a trash or pretreatment vessel, an aeration vessel, and a pump tank. In a typical system, wastewater from a residence, industrial facility, or the like, passes into the pretreatment tank where most of the solids settle out. The effluent from the pretreatment tank then flows into the aeration vessel wherein remaining solids are subjected to aerobic digestion to provide a substantially solids-free effluent which then passes into the pump tank for discharge. It is common for the aeration vessel to include an inverted frustoconical partition disposed in the aeration vessel which effectively divides the aeration vessel into an aeration chamber and a clarifier chamber, an oxygen-containing gas being introduced into the oxygen chamber, substantially clarified water passing from the clarifier chamber into the pump tank.

While the various vessels making up the aerobic wastewater treatment system can be made of a variety of materials including concrete, fiberglass, steel, etc., many such vessels are made of composites comprised of fiberglass or similar reinforcing materials and resins, e.g., epoxy, phenolics, etc.

U.S. Pat. No. 6,358,411, incorporated herein by reference for all purposes, discloses a wastewater treatment plant comprised of two main vessels, one of the vessels having an interior partition forming a closed compartment as to the remaining interior part of the vessel. Thus, effectively there is formed a three vessel system using only the two main tanks. In the system disclosed in U.S. Pat. No. 6,358,411, one of the vessels forms an aerobic treatment chamber and in this regard contains an inverted, frustoconical partition to divide the vessel into a clarifier chamber and an aeration chamber. The other vessel, as noted above, has a compartment formed therein by means of a partition, the partition serving to form a pretreatment chamber, the remainder of the vessel forming a holding chamber or pump tank.

SUMMARY OF THE INVENTION

In one embodiment, the present invention provides a vessel assembly for use in wastewater treatment systems comprising a first vessel having a top, a side wall and a bottom wall and a second vessel having a top, a side wall and a bottom wall, the top of each of the vessels having an upwardly facing rim extending in a direction inwardly from the side wall. There is a first gusset assembly having a first attachment surface, a second attachment surface, a first end and a second end, the first attachment surface being adjacent the first end and being attached to the rim of the first vessel, the second attachment surface being adjacent the second end and being attached to the rim of the second vessel. There is also a second gusset assembly, the second gusset assembly being displaced axially downwardly from the first gusset assembly and being attached to the first and second vessels.

In another embodiment of the present invention, at least one of the first or second gusset assemblies can have an upwardly facing pocket which serves as a receptacle for dirt, gravel or other fill material.

DETAILED DESCRIPTION OF PREFERRED EMBODIMENTS

While the present invention will be directed with respect to an aerobic wastewater system, it is not as limited. The vessel assembly of the present invention could be used in a septic system.

Figure 1:
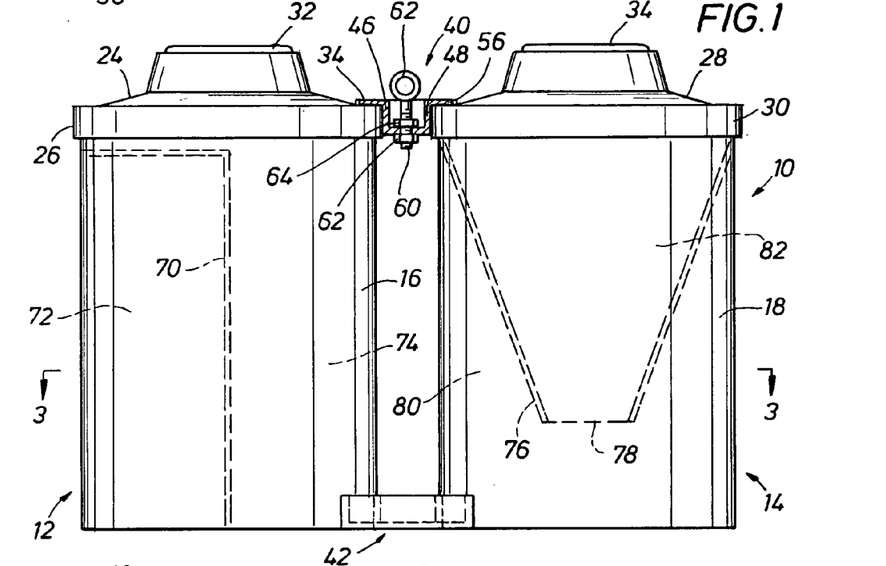
FIG. 1 is a side elevational view with a portion broken away showing one embodiment of the vessel assembly of the present invention.
Figure 2:
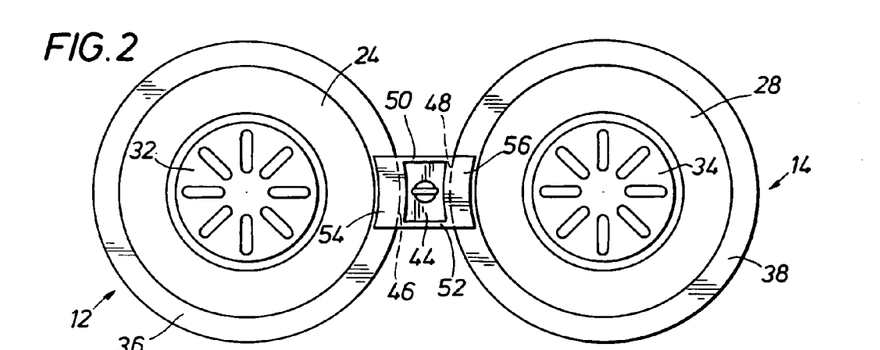
FIG. 2 is a top plan view of the vessel assembly shown in FIG. 1.

Referring first to FIG. 1, one embodiment of the present invention, shown generally as 10, is depicted. Vessel assembly 10 comprises a first vessel 12 and a second vessel 14 which as can be seen have cylindrical side walls 16 and 18, respectively. First vessel 12 has a bottom wall 20 while second vessel 14 has a bottom wall 22. The first vessel 12 has a cover 24 including an annular collar 26 in surrounding relationship to cylindrical side wall 16. Likewise, second vessel 14 is provided with a cover 28 forming an annular collar 30 again in surrounding relationship to cylindrical side wall 18. An access hatch 32 permits access to the interior of vessel 12 while an access hatch 34 permits access to the interior of vessel 14. As best seen in FIG. 2, the first vessel 12 is provided with an annular rim 36 formed on cover 24 while second vessel 14 is provided with an annular rim 38 formed on cover 28. Although not necessary, rims 36 and 38 form generally planar surfaces. It will be understood that when the vessel assembly is used as a septic system, the accesses and the access hatches could be eliminated.

Figure 3:
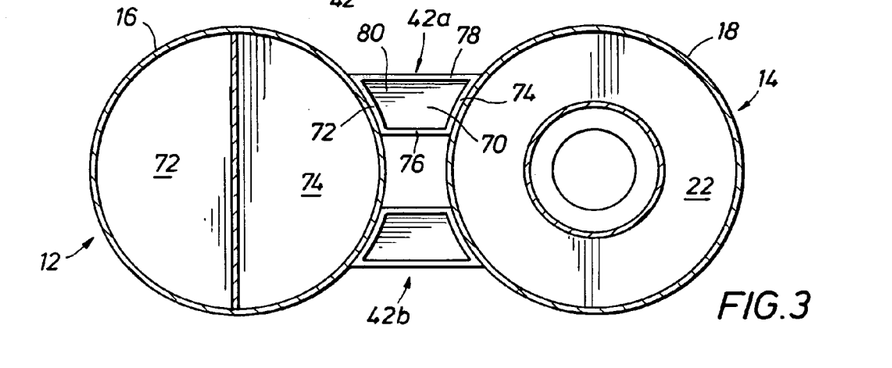
FIG. 3 is a view taken along the lines 3-3 of FIG. 1.

Vessels 12 and 14 are rigidly secured to one another by means of upper and lower gusset assemblies 40 and 42 respectively. As seen in FIG. 3, gusset assembly 42 is comprised of two subassemblies 42a and 42b described more fully hereafter. Upper gusset assembly 40 has a U-shaped web formed by a bottom wall 44 and first and second legs 46 and 48. As seen in FIGS. 1 and 2, legs 46 and 48 are contoured to the shape of collars 26 and 30, respectively, and are secured thereto by a suitable adhesive or attachment devices such as screws. Gusset assembly 40 further includes first and second end walls 50 and 52 attached to bottom wall 44 and legs 46 and 48. Thus, as can be seen an upwardly facing pocket is formed by bottom wall 44, first and second legs 46 and 48 and end walls 50 and 52. Extending laterally outwardly from first leg 46 is a wing 54, wing 54 forming an first attachment surface. In like fashion, extending laterally outwardly from leg 48 is a second wing 56, wing 56 forming a second attachment surface. As can be seen, the attachment surfaces on wings 54 and 56 are in engagement and can be secured to rims 36 and 38, respectively, by adhesive, screws or the like. As shown, wings 54 and 56 are secured by adhesive, screws, etc. to rims 36 and 38, respectively.

Extending through bottom wall 44 of gusset assembly 40 is the threaded shank 60 of a lifting eye 62, lifting eye 62 being secured to bottom wall 44 by means of nut 62 and lock nut 64.

Gusset sub assemblies 42a and 42b are of like construction and accordingly only one will be described. Gusset 42a has a bottom wall 70, a first vertically upright extending leg 72 and a second vertically upright extending leg 74. As can be seen, legs 72 and 74 have their outside surface contoured to the outside surfaces of the walls 16 and 18, respectively, of vessels 12 and 14, respectively. Gusset assembly 42a further includes first and second end walls 76 and 78, the legs 72, 74, bottom wall 70 and end walls 76 and 78 cooperating to form an upwardly facing pocket 80. As in the case of gusset assembly 40, gusset assembly 42a is secured to the walls 16 and 18 of vessels 12 and 14, respectively, by means of adhesive, screws, etc.

As can be seen from the above, both upper and lower gusset assemblies 40 and 42 form upwardly facing pockets. These upwardly facing pockets serve the important purpose of acting as reservoirs for dirt, gravel or the like, when the vessel assembly is set in the ground and, as is well known to those skilled in the art, only the necks of the vessels extend above ground. In other words, the pockets formed by the upper and lower gusset assemblies act against any buoyant upward forces, e.g., a high water table, excessive rain, etc., which would exert an upward force on the vessel assembly and in severe cases cause it to float. It will be understood, however, that one or both of the gussets could be formed without any pockets, e.g., they could just be plate-like with a generally planar upwardly facing surface.

The vessel assembly of the present invention in addition to being compact and easily transportable, in one embodiment, also uses only two main vessels to accomplish the function of typical three vessel systems used in aerobic wastewater treatment plants or systems. To this end, and as seen with respect to FIG. 1, vessel 12 is provided with an internal partition 70 which effectively divides vessel 12 into a first compartment 72 and a second compartment 74. Second vessel 14 has an inverted, frustoconical partition 76 having an open mouth 78. Partition 76 thus divides second vessel 14 into two compartments or chambers, namely an aeration chamber 80 and a clarifier chamber 82. Thus as can be seen, vessel assembly 10 provides all the usual major compartments of a typical aerobic wastewater treatment system. In this regard, chamber or compartment 72 serves as a pretreatment tank, chamber 80 serves as an aerobic chamber, chamber 82 serves as a clarifier and chamber 74 serves as a pump or holding tank. Although not shown, it will be appreciated that necessary plumbing, pumps, floats, valves, etc., would be employed to render vessel assembly 10 an operative, aerobic wastewater treatment system. Thus, there would be an inlet to chamber 72, an outlet connecting chamber 72 with chamber 80, and an outlet from chamber 82 into chamber 74. In cases where the vessel assembly was used as a septic system, the partitions 70 and 76 could be dispensed with or a partition such as partition 70 could be used.

Figure 4:
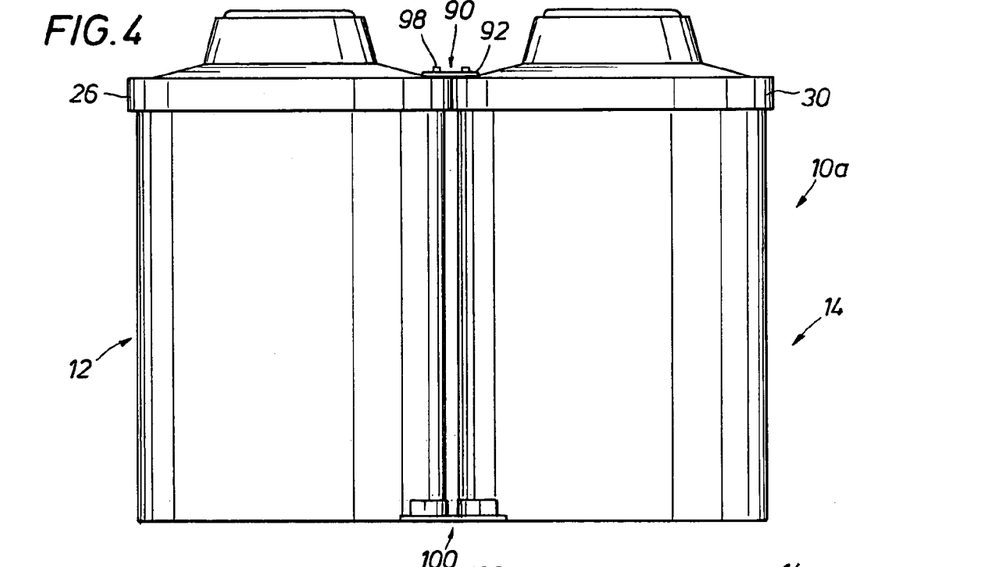
FIG. 4 is a side elevational view of another embodiment of the vessel assembly of the present invention.
Figure 5:
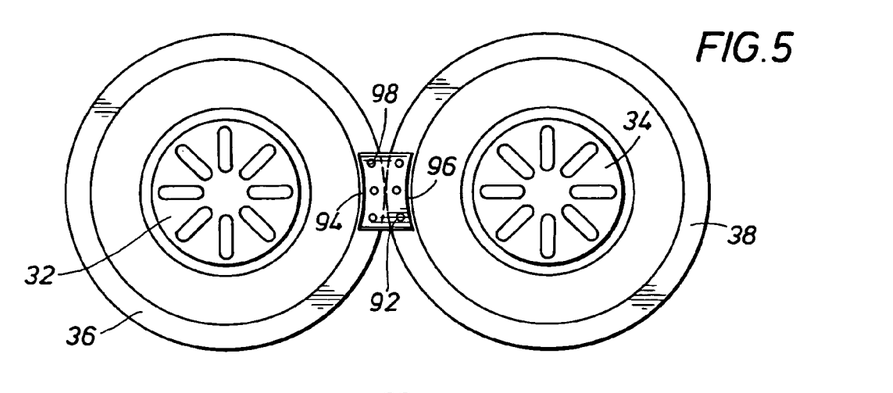
FIG. 5 is a top plan view of the vessel assembly shown in FIG. 4.
Figure 6:
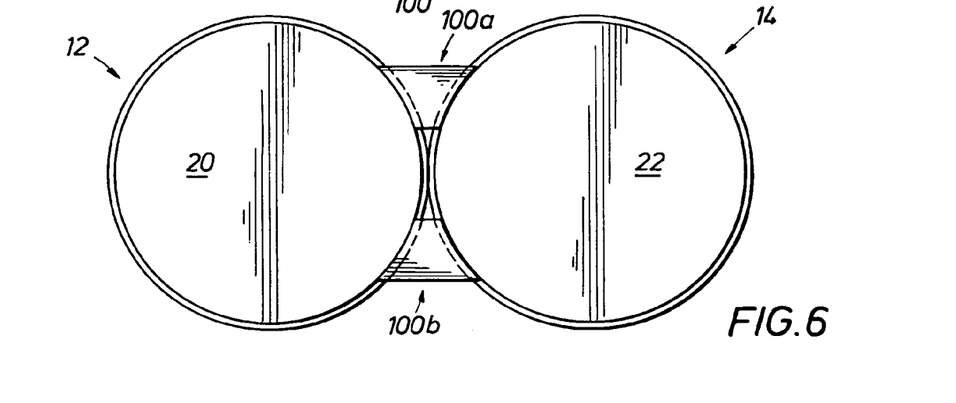
FIG. 6 is a bottom plan view of the vessel assembly shown in FIG. 4.

Referring now to FIGS. 4, 5 and 6, there is shown another embodiment of the present invention. The embodiment shown in the aforementioned figures differs from that shown in FIGS. 1-3 in the nature of the upper gusset assembly. In the embodiment shown in FIGS. 4-6, the first and second vessels 12 and 14, respectively, are effectively in engagement with one another in the sense that collars 26 and 30 are touching or are closely adjacent to one another. First or upper gusset assembly 90, as best shown in FIG. 5, comprises a substantially flat plate 92 having arcuate edges 94 and 96 which generally follow the curvature of rims 36 and 38 respectively. Plate 92 is attached to rims 36 and 38 by means of screws 98 which extend through plate 92 into rims 36 and 38, there being three screws 98 attaching plate 92 to rim 36 and three screws 98 attaching plate 92 to rim 38. Although attached by screws, it will be understood that plate 92 could be attached to rims 36 and 38 by means of an adhesive.

Lower gusset assembly 100 is similar to gusset assembly 42 shown in FIGS. 1-3 and comprises a first gusset subassembly 100a and a second gusset subassembly 100b. Gusset assemblies 100a and 100b are substantially identical in construction and indeed differ from gusset subassemblies 42a and 42b only in that because of the close proximity of vessels 12 and 14 they have a smaller span between the vessels and therefore form smaller upwardly facing pockets (not shown). However, the pockets formed by gusset subassemblies 100a and 100b serve the same purpose as described above with respect to gusset assemblies 42a, 42b and 40 in that they capture dirt, gravel or other fill which is placed in the excavation in which the vessel assembly 10a is positioned and in the same manner described above, act against upward forces of buoyancy which would tend to float the vessel assembly 10a.

Figure 7:
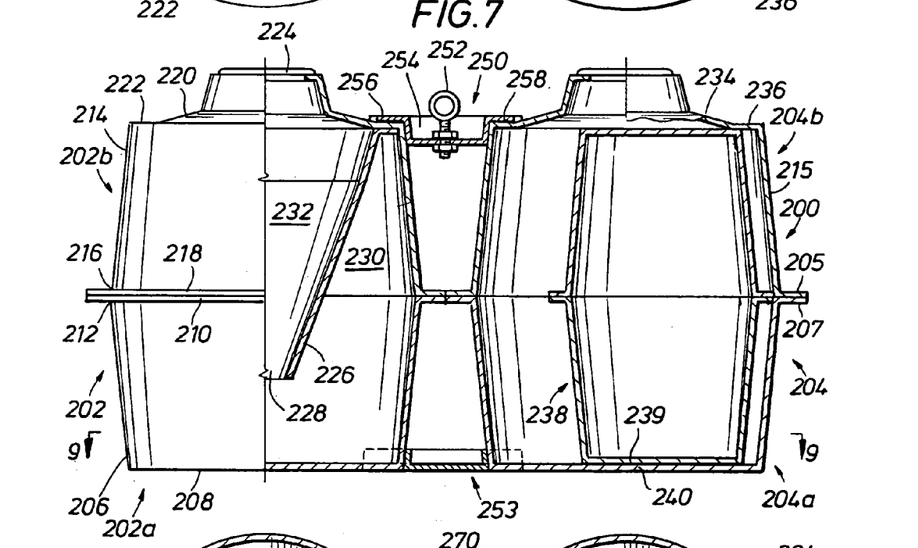
FIG. 7 is a side elevational view, partly in section showing another embodiment of the vessel assembly of the present invention.
Figure 8:
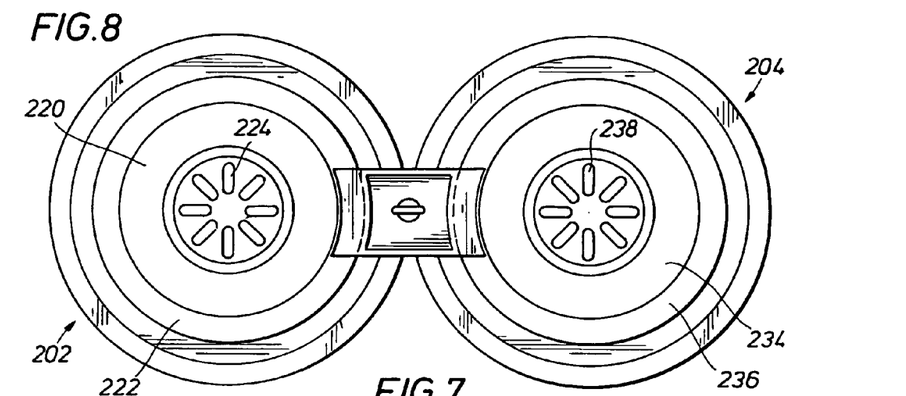
FIG. 8 is a top plan view of the vessel assembly shown in FIG. 7.
Figure 9:
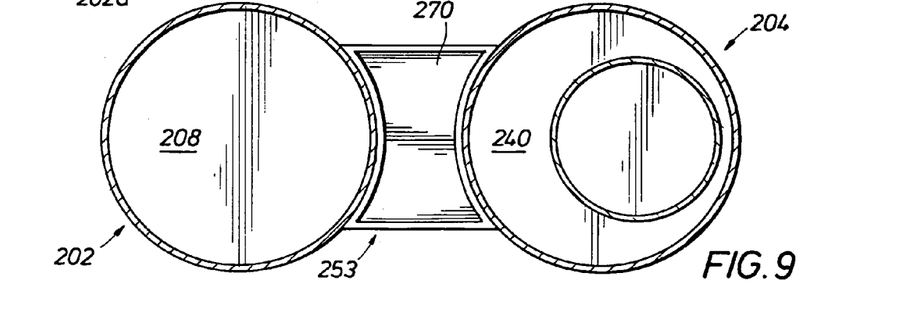
FIG. 9 is a view taken along the lines 9-9 of FIG. 7.

Referring now to FIGS. 7, 8 and 9 there is shown another embodiment of the present invention. In the embodiments shown in FIGS. 7-12, the vessels are constructed as disclosed in U.S. patent application Ser. No. 11/263,462 filed Oct. 31, 2005 for AERATION VESSEL FOR USE IN AEROBIC WASTEWATER TREATMENT SYSTEM, the disclosure of which is incorporated herein by reference for all purposes. Turning then to FIGS. 7, 8 and 9, the vessel assembly shown generally as 200 comprises a first vessel 202 and a second vessel 204. Vessel 202 comprises a first or bottom section 202a and a second or top section 202b. Bottom section 202a has a inverted frustoconical side wall 206 and a bottom wall 208. An annular flange 210 extends radially outwardly from an upper edge 212 of bottom section 202a.

Top section 202b comprises a frustoconical wall 214 having a lower edge 216. Extending outwardly from lower edge 216 is an annular flange 218, flanges 218 and 210 being mated to one another by adhesive, bolts, etc. First vessel 202 also has a top 220 with an annular rim 222. A hatch 224 provides access to the interior of vessel 202. Disposed interiorly of vessel 202 is an inverted frustoconical partition 226 having an open mouth 228, partition 226 serving to divide the vessel 202 into an aeration chamber 230 and a clarifier chamber 232.

Vessel 204 is similar in construction to vessel 202 and has a lower section 204a and an upper section 204b, the wall and flange construction of vessel 204 being as described with respect to vessel 202. Thus there are formed annular flanges 205 and 207. Vessel 204 has a top 234 with an annular rim 236. A hatch 238 provides access to the interior of vessel 204.

Disposed interiorly of vessel 204 is a vessel shown generally as 238. Vessel 238 is virtually identical in construction to vessels 202 and 204 with the exception that vessel 238 is essentially formed by taking two of the bottom sections, e.g., 202a or 204a, and mating them together at the flanges, i.e., vessel 238 does not have a top with a hatch as shown with respect to vessel 202 or 204. Additionally, and as can be seen in FIG. 7, vessel 238 is smaller and has less volume than vessel 204. Vessel 238 is conveniently positioned in vessel 204 by adhesively securing the bottom wall 239 of vessel 238 to the bottom wall 240 of vessel 204 and sizing it such that the top of vessel 238 engages the underside of annular rim 236. Thus, vessel 238 is effectively wedged between rim 236 and bottom wall 240 thereby preventing vessel 238 from floating. This wedging also contributes to structural. In effect, vessel 238 can be considered a partition disposed in vessel 204 which, like partition 70 in vessel 12, divides vessel 204 into two compartments, the compartment formed by vessel 238 acting as a pretreated tank.

As seen, vessels 202 and 204 are positioned adjacent one another such that flanges 218 and 210 are clearly adjacent or are in engagement with flanges 205 and 207, respectively. To secure vessel 202 and 204 together in a single unit, there is provided an upper gusset assembly 250 and a lower gusset assembly 252. Upper gusset assembly 250 is substantially identical, save for size, to gusset assembly 40 shown in FIGS. 1 and 2. Thus, gusset assembly 250 is provided with a lifting eye 252 extending out of a pocket 254. Likewise, gusset assembly 250 has laterally outwardly extending wings 256 and 258 attached to rims 222 and 236, respectively. Likewise the legs of the gusset assembly 250 are attached to the side walls of the vessels 214 and 215, respectively.

Lower gusset assembly 253 is similar to upper gusset assembly 250 and provides a pocket 270 to receive fill dirt gravel, etc. Gusset assembly 253 has a generally hourglass configuration when viewed in top plan view, the side walls of gusset 253 being contoured to adapt to the shape of the outside walls of vessel 202 and 204. As in the case of gusset assembly 42, gusset assembly 253 can be secured to vessels 202 and 204 by means of adhesive.

Figure 10:
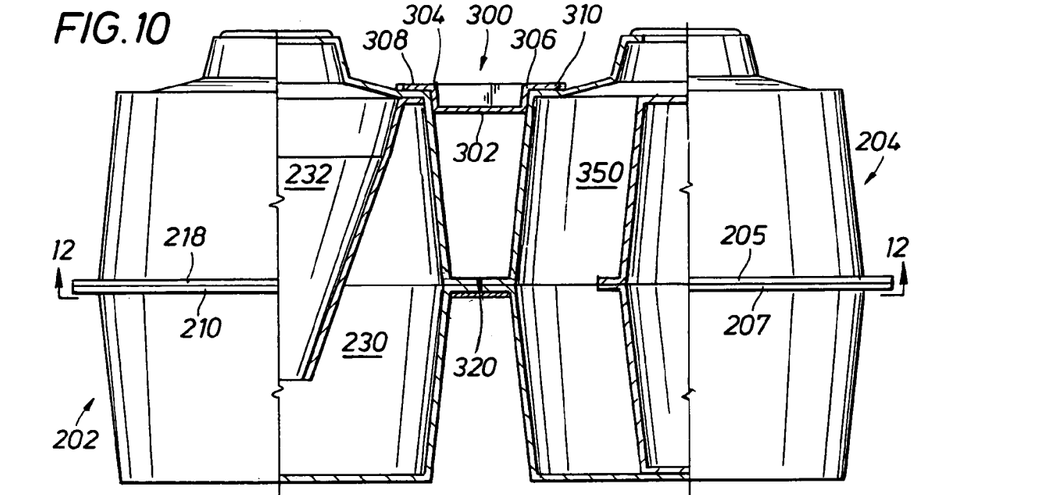
FIG. 10 is a side elevational view, partly in section of another embodiment of the vessel assembly of the present invention.
Figure 11:
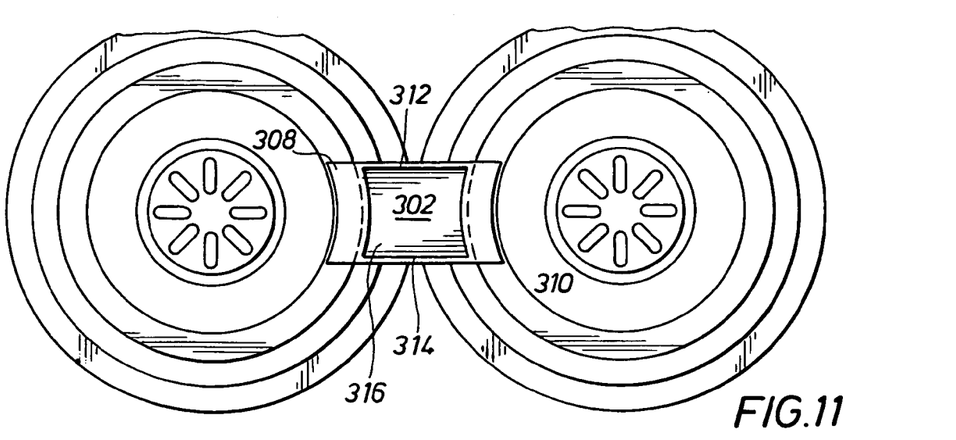
FIG. 11 is a top plan view of the vessel assembly shown in FIG. 10.
Figure 12:
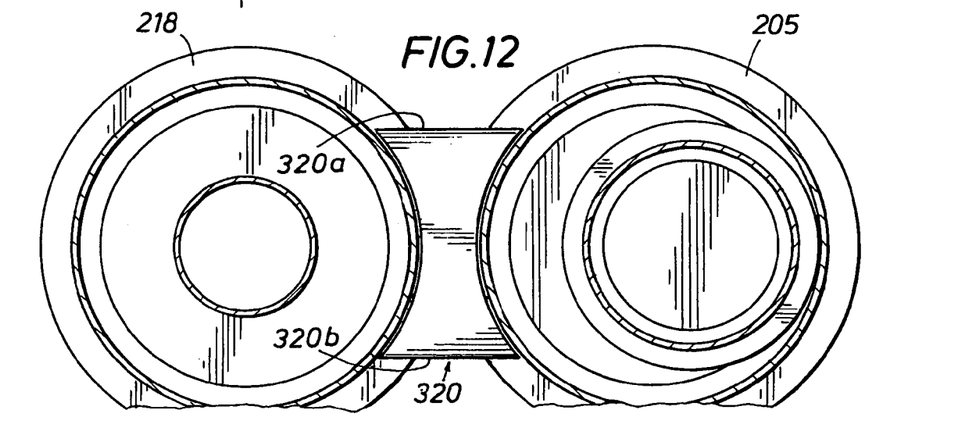
FIG. 12 is a view taken along the lines 12-12 of FIG. 10.

Turning now to FIGS. 10-12 there is shown another embodiment of the present invention. The embodiment shown in FIGS. 10-12 is substantially identical to that shown in FIGS. 7-9 with the exception that the gusset assemblies securing the vessels 202 and 204 together are different. Thus, upper gusset assembly 300 comprises a U-shaped web having a bottom wall 302, a first side leg 304, a second side leg 306, a first wing 308 extending from leg 304 and a second wing 310 extending from leg 306. Gusset 300 also has a first end wall 312 and a second end wall 314, an upwardly facing pocket 316 being formed by bottom wall 302, side legs 304 and 306 and end walls 312 and 314.

There is a second gusset assembly shown generally as 320 comprising a generally flat plate that is generally hourglass shaped, as seen in top plan view. As seen, gusset assembly 320 has opposed outer, side edges which are contoured to the shape of the vessels 202 and 204. Additionally, as can be seen, the flanges 210 and 218 are in engagement with flanges 207 and 205, respectively, or at least they are closely adjacent. In any event, gusset assembly 320 is attached on one side to flange 210 and on its opposite side to flange 207. As shown the gusset assembly 320 is adhesively attached to flanges 210, 207, it will be understood that it could be attached by bolts and nuts or other attachment means well known to those skilled in the art. While the gusset 320, as shown, is attached to the underside of flanges 210 and 207, it is to be understood that it could be attached to flanges 218 and 205. However, attaching it to the underside of gussets 210 and 207 provides better structural integrity.

As best seen in FIG. 12, gusset assembly 320 has a substantial width, as measured from end 320a to end 320b, in relation to the diameter of the flanges 218 or 205. Thus, the area of gusset of 320 not only serves the purpose of increasing the structural integrity of the connection between vessels 202 and 204, it also serves as a relatively large surface upon which dirt, gravel or the like can rest offsetting any buoyancy effects on the vessel assembly. It should be recognized that the flanges 205 and 218 also serve as surfaces upon which dirt, sand, gravel or other fill material can rest, again, counteracting the buoyancy of the vessel assembly. Also, with particular to vessels portions 202b and 204b, the inverted frustoconical nature of their outer walls provides a surface upon which dirt, sand, gravel and other fill materials can act to impart a downward force factor, again, counteracting any buoyancy forces acting on the vessel assembly. With respect to the relative width of gusset 320 to the diametrical distance across the flanges, e.g., 218, 205, it has been found that a ratio of the width of the gusset as measured between ends 320a and 320b to the diametrical distance across the flanges, e.g., flanges 205, 218, of from 0.4 to 1.00 is desirable. Such a ratio provides sufficient structural integrity to the vessel assembly and provides adequate surface area for dirt, gravel or other fill materials to counter buoyancy effects upon the vessel assembly.

With respect to the embodiments shown in FIGS. 7-12, vessel 238 would form a pretreatment tank there being a suitable inlet from a residence, or the like. The remainder of the interior of vessel 204 would form a holding or pump tank 350 into which effluent from clarifier 232 would flow. Although not shown, and as described above with respect to the embodiments shown in FIGS. 1-6, suitable plumbing, pumps, valves, sensors, etc., would be supplied to provide proper communication between the various chambers, e.g., the pretreatment tank and aerobic tank, etc.

As can be seen from the above, the use of the gusset assemblies of the present invention provides a strong connection between the two primary vessels. In this regard, and preferably, all surfaces of the gusset assemblies which are in contact with the vessels are secured thereto either adhesively, or by screws, nuts and bolts, etc., or a combination thereof. In particular, since the invention is primarily directed to vessels which are formed of composites as described above, adhesively securing the gussets to the vessels virtually makes for a monolithic structure vis-à-vis the strength of the connections between the vessels. In a preferred embodiment wherein at least one of the gusset assemblies forms an upwardly facing pocket to act as a receptacle for dirt, gravel and other fill material, upwardly buoyant forces acting on the vessel assembly are countered by the weight of the fill material minimizing the chances that the vessel assembly will tend to float. As noted, this is also true of the plate gusset 320, the flanges 205 and 216, and the side walls 204b and 202b.

As can be seen from the above, the present invention provides a vessel assembly for use in an aerobic wastewater treatment system that has gussets that provide upwardly facing surfaces and/or pockets on which fill dirt, sand, gravel, etc. can be deposited or received to offset any buoyancy forces acting on the vessel assembly and tending to float the vessel assembly out of the ground. In this regard, and as understood by those skilled in the art, aerobic wastewater systems generally have their tank components buried, with only the tops of the vessels exposed, such that the hatches can be accessed for servicing and the like.

While the vessel assembly of the present invention has been described above with respect to two primary vessels, e.g., vessels 202 and 204, it will be understood that it is not so limited and that three or more vessels could be similarly attached if desired. Accordingly, the invention is not limited to two primary vessels being attached by suitable gusset assemblies. For example, with respect to the embodiment shown in FIG. 10, vessel 202 forms an aeration tank with a clarifier, vessel 204 forms a pump tank and vessel 238 forms a pretreatment tank. It will be recognized by those skilled in the art that the pretreatment tank could be a separate tank similar in configuration to tanks 202 and 204 and that there would be another gusset assembly similar to gusset assembly 320 which connected the third tank with the two tanks shown in FIG. 10. In other words, it is not necessary that the pretreatment tank, as shown in the embodiments of FIGS. 1, 7 and 10 be disposed internally of the pump tank.

As can be seen from the above, all of the gusset assemblies are between the vessels to be connected as opposed to being attached to the sides of the vessels. This makes the assembly more compact and easier to install since the excavation into which the vessel assembly is to be placed can have a smaller footprint than would be the case if flanges or the like were extending outwardly from the sides of the vessel. In short, the gussets are within the footprint of the vessels themselves whether they be of the cylindrical type shown in FIG. 1 or the double frustoconical shape as shown, for example, in FIG. 10. Stated differently, the gusset assemblies do not extend laterally outwardly from the greatest diametrical distance of any structural element forming the vessels to which the gussets are attached. Thus, as seen in FIG. 3, the gussets do not extend beyond the outside diameter of either of the vessels 12 or 14. In like regard, the gussets do not extend outside the diametrical extent of the flanges 210, 218 of vessel 202 or flanges 205, 207 of vessel 204.

Although as shown, the primary vessels, e.g., vessels 202 and 204, are of substantially the same size both in terms of diameter and height. It is to be understood that the present invention can also be employed with vessels of differing dimensions. Thus, for example, with respect to the cylindrical vessels shown in FIG. 1, one of the cylindrical vessels, e.g., vessel 12, could have a smaller diameter than that of vessel 14 and have a lesser height provided that the bottom walls of the vessels 12, 14 were coplanar so as to make for ease of installation, i.e., an excavation that does not require an uneven bottom. The same is true of the vessel assembly shown in FIG. 10 wherein vessel 204 can be of lesser diameter and/or height than vessel 202 provided once again that the bottom walls of the vessels are coplanar. Also, in the case of the vessels shown in FIG. 10 regardless of the relative sizes of the vessels 202 and 204, the flanges 205, 207, 210 and 218 would all be at the same height from the bottom walls of the vessels such that the gusset, e.g., gusset 320, could be affixed to the flanges. Thus, by way of example only, if a vessel similar to vessel 204 had a lesser height than a vessel similar to vessel 202, both the bottom walls of those vessels would be coplanar and the flanges, e.g., flanges 218, 210, 205 and 207 would be coplanar. However, the top of the vessel similar to vessel 204 would be below that of the vessel similar to vessel 202, i.e., the vessel similar to vessel 204 would be shorter than the vessel similar to vessel 202.

Aside from a vessel assembly wherein two primary tanks are attached, the present invention also provides a vessel in a vessel assembly. By way of example and with respect to vessel 204 shown in FIG. 10, if it be assumed that vessel 204 was separate from vessel 202, i.e., there were no gusset assemblies such as gusset assemblies 300 and 320 connecting the vessels, then there would be provided a single primary vessel, e.g., a vessel similar to vessel 204, in which was disposed a secondary vessel, e.g., a vessel similar to vessel 238. Also, the vessel similar to vessel 238 could be positioned in the vessel similar to vessel 204 in the manner described above, i.e., the vessel similar to vessel 238 could be effectively wedged in the vessel similar to vessel 204. Such a vessel in a vessel assembly as described would provide an ideal treatment tank for a septic system and in this regard to portion which corresponds to 204b of vessel 204 could have a planar top wall similar to planar bottom wall 240 of vessel portion 204a. In other words, it may not be necessary to have an access hatch in the vessel in a vessel when it is used in a septic system. In the case where the smaller (secondary) vessel was disposed in the larger (primary) vessel, if the larger vessel was of the shape shown, for example, in FIG. 7, then the smaller vessel, e.g., vessel 238, could be wedged between the rim 236 and the bottom wall 240 as shown in FIG. 7. However, in cases where the upper portion 204b of vessel 204 had a substantially planar wall such as bottom wall 240 of lower section 204a, then the upper wall of vessel 238 corresponding to wall 239 would be in engagement with the upper wall formed on the upper section 204b of vessel 204. By adhesively securing the bottom wall 239 and 240 together and the upper wall of vessel 238 corresponding to wall 239 to the upper wall of vessel 204b corresponding to bottom wall 240 of vessel 204a, there would be provided a rigid, structurally sound assembly since vessel 238 would be rigidly secured inside of vessel 204.

The foregoing description and examples illustrate selected embodiments of the present invention. In light thereof, variations and modifications will be suggested to one skilled in the art, all of which are in the spirit and purview of this invention.

What is claimed is:

1. A vessel assembly for use in a wastewater treatment system comprising:
   a first vessel having a top, a side wall and a bottom wall;
   a second vessel having a top, a side wall and a bottom wall, said top of each of said vessels having an upwardly facing rim extending in a direction inwardly from said side wall;
   a first gusset assembly having a first attachment surface, a second attachment surface, a first end and a second end, said first attachment surface being adjacent said first end and being attached to said rim of said first vessel, said second attachment surface being adjacent said second end and being attached to said rim of said second vessel; and a second gusset assembly, said second gusset assembly being displaced axially downwardly from said first gusset assembly and being attached to said first and second vessels.

2. The vessel assembly of claim 1, wherein each of said first and second vessels comprises:
a bottom section comprising an inverted frustoconical side wall, having an upper edge, a first annular, radially outwardly extending flange extending from said upper edge, said first flange forming an annular, axially upwardly facing, mating surface, and an axially downwardly facing bottom surface;
a top section comprising a frustoconical side wall having a lower edge, and a top edge, a second annular, radially outwardly extending flange extending from said lower edge, said second flange forming an annular, axially downwardly facing mating surface and an axially upwardly facing top surface; and
said first and second mating surfaces being in sealing engagement.

3. The vessel assembly of claim 1, wherein said second gusset assembly comprises a web portion, said web portion having first and second ends, a first flange extending from said first end of said web, a second flange extending from said second end of said web, each of said first and second flanges having an outwardly facing surface, said outwardly facing surface of said first flange having a portion contoured to complement the shape of said side wall of said first vessel, said outwardly facing surface of said second flange having a portion contoured to complement the shape of said side wall of said second vessel, said portions of said first and second flanges being attached to the side walls of said first and second vessels, respectively.

4. The vessel assembly of claim 1, wherein said first and second vessels have cylindrical side walls.

5. The vessel assembly of claim 4, wherein said first gusset assembly comprises a substantially flat plate.

6. The vessel assembly of any one of claims 2 or 4, wherein said first gusset assembly comprises a U-shaped web portion, said U-shaped web portion having a first, axially extending leg and a second, axially extending leg.

7. The vessel assembly of claim 6, wherein said first gusset assembly further comprises:
a first end wall attached to one side of said U-shaped web and a second end wall attached to the opposite side of said U-shaped web, said U-shaped web and said first and second end walls forming an upwardly facing pocket, said first leg being attached to said side wall of said first vessel, said second leg attached to said side wall of said second vessel.

8. The vessel assembly of claim 6, wherein said U-shaped web has a bottom wall and a lifting eye is attached to said bottom wall.

9. The vessel assembly of any one of claims 2 or 4, wherein said second gusset assembly comprises first and second spaced, gusset subassemblies, the web portion of each of said first and second gusset subassemblies forming an upwardly facing pocket, said pocket being formed by said first and second flanges, a bottom wall and first and second spaced side walls.

10. The vessel assembly of claim 4, wherein each of said tops of said vessels have an annular collar in surrounding relationship to said vessel, said collar being adjacent said rim, said collar of said first vessel and collar of said second vessel being in engagement.

11. The vessel assembly of claim 2, wherein said second gusset assembly comprises first and second, spaced subassemblies, each of said subassemblies comprising a substantially flat plate, attached to said upwardly facing top surface of said top sections.

12. The vessel assembly of any one of claims 2 or 11, wherein said first and second annular flanges on said bottom section and top section, respectively, have annular, radially outwardly facing edge surfaces and said edge surfaces are in engagement.

13. The vessel assembly of claim 4, wherein said top is formed by a cover.

14. The vessel assembly of any one of claims 2 or 4, wherein said first and second vessels are made of a composite.

15. The vessel assembly of claim 14, wherein said first and second gusset assemblies are made of a composite.

16. The vessel assembly of claim 14, wherein said gusset assemblies are attached to said first and second vessels by an adhesive.

17. The vessel assembly of claim 1, where one of said first and second vessels has an interior partition dividing said one of said first and second vessels into two compartments.

18. The vessel assembly of claim 1, wherein at least one of said first and second gusset assemblies forms an upwardly facing pocket.

19. The vessel assembly of claim 11, wherein said second gusset assembly has a first end and a second end, said first end having a bottom surface attached to said upwardly facing top surface of one of said top sections, said second end having a bottom surface attached to said upwardly facing top surface of the other of said top sections.

20. Vessel assembly of claim 19 wherein said gusset has a first side and a second side, the ratio of the distance between said first side and said second side to the diametrical distance of said annular flange of said top section being from 0.4 to 1.00.

21. The vessel assembly of claim 2, wherein there is a third vessel disposed in said first vessel.

22. The vessel assembly of claim 21, wherein said third vessel comprises:
a lower section comprising an inverted frustoconical side wall having an upper edge, a first annular, radially outwardly extending flange extending from said upper edge, said first flange forming an annular, axially upwardly facing, mating surface;
an upper section comprising a frustoconical side wall having an upper edge, a lower edge, and a second annular, radially outwardly extending flange extending from said lower edge, said second flange forming an annular, axially downwardly facing mating surface, said first and second mating surfaces on said lower and upper sections being in sealing engagement.

23. The vessel assembly of claim 22, wherein said first vessel has an annular, axially facing rim and a bottom wall, said edge of said upper section of said third vessel being in engagement with said rim of said first vessel and said lower section of said third vessel has a bottom wall, said bottom wall of said third vessel being in contact with said bottom wall of said first vessel.

24. The vessel assembly of claim 23, wherein said bottom wall of said first vessel is adhesively secured to said bottom wall of said first vessel.

25. The vessel assembly of claim 2, wherein said second gusset assembly comprises a substantially flat plate attached to said first flanges of said first and second vessels or said second flanges of said first and second vessels.

26. A vessel for use in a wastewater treatment system comprising:

a primary vessel comprising:
  a bottom section comprising an inverted frustoconical side wall having an upper edge, a first annular, radially outwardly extending flange extending from said upper edge, said first flange forming an annular, axially upwardly facing, mating surface and an axially downwardly facing bottom surface;
  a top section comprising a frustoconical side wall having a lower edge and a top edge, a second annular, radially outwardly extending flange extending from said lower edge, said second flange forming an annular, axially downwardly facing mating surface in an axially upwardly facing top surface;
  said first and second mating surfaces being in sealing engagement; and
a secondary vessel disposed in said primary vessel, said secondary vessel comprising:
  a lower section comprising an inverted frustoconical side wall having an upper edge, a first annular, radially outwardly extending flange extending from said upper edge, said first flange forming an annular, axially upwardly facing, mating surface;
  an upper section comprising a frustoconical side wall having an upper edge, a lower edge, and a second annular, radially outwardly extending flange extending from said lower edge, said second flange forming an annular, axially downwardly facing mating surface, said first and second mating surfaces on said upper and lower sections being in sealing engagement.

* * * * *